United States Patent Office 3,389,181
Patented June 18, 1968

3,389,181
METHOD FOR THE PREPARATION OF DIFLUOROKETONES
Richard F. Merritt, Huntsville, Ala., assignor to Rohm & Haas Company, Philadelphia, Pa., a corporation of Delaware
No Drawing. Filed July 20, 1964, Ser. No. 383,906
5 Claims. (Cl. 260—590)

ABSTRACT OF THE DISCLOSURE

Ketones of the formula $$R-\overset{O}{\underset{\|}{C}}-CF_2-R$$

are prepared by reacting oxygen difluoride ($OF_2$) with an acetylenic compound having the formula $R-C\equiv CR$, wherein R represents $C_{1-12}$ alkyl, phenyl or alkyl substituted phenyl in which the alkyl totals up to eight carbon atoms.

---

This invention deals with a method for the preparation of specific difluoroketones.

The difluoroketones prepared by the method of this invention may be represented by the formula $$R-\underset{\underset{O}{\|}}{C}-CF_2R$$

wherein R represents alkyl groups of 1 to 12 carbon atoms, preferably 1 to 4, phenyl, or alkyl-substituted phenyl in which the alkyl totals up to eight carbon atoms. There may be one or more alkyl substituents as long as the stated total carbon content is observed.

Typically, R may represent methyl, ethyl, isopropyl, butyl, hexyl, 2-ethylhexyl, decyl, dodecyl, phenyl, tolyl, xylyl and dibutylphenyl.

The difluoroketones of this invention are prepared by reacting oxygen difluoride ($OF_2$) with an acetylenic compound having the formula $$R-C\equiv CR$$

at a temperature range of about $-80°$ C. to $0°$ C., preferably about $-80°$ C. to $-40°$ C.

Typical acetylenic reactants include diphenylacetylene, pentyne-1, pentyne-2, octyne-1, octyne-3, decyne-2, dodecyne-6, octadecyne-4, methylphenylacetylene, butylphenylacetylene, hexylphenylacetylene, octylphenylacetylene, and dodecylphenylacetylene.

The reaction is strongly exothermic in nature and generally reaction temperatures in the lower portion of the stated range are employed for purposes of safety. The oxygen difluoride and acetylenic reactant react in a substantially 1:1 ratio. It is preferred generally to employ an excess of oxygen difluoride in order to obtain maximum yields. The excess oxygen difluoride is readily removed at the conclusion of the reaction by low temperature vacuum distillation.

It is important that oxygen difluoride be added gradually to the acetylene. As has been pointed out previously, the reaction is exothermic in nature but the gradual addition of oxygen difluoride is necessary for purposes of control and safety. Furthermore, the acetylene cannot be added to the oxygen difluoride without considerable hazards of explosions. Hence, one must adhere strictly to this aspect of the invention. It is preferred to add the oxygen difluoride at a rate substantially commensurate with its rate of reaction in order to control the reaction and maximize yields.

Subatmospheric pressures are employed, preferably no greater than 700 mm. It is preferred to use pressures in the range of about 100 to 600 mm.

While a solvent is not absolutely required, particularly with the lower molecular weight olefin reactants, it is frequently desirable to employ an inert volatile solvent in order to bring the reactants into desired proximity while controlling their concentrations. In order to be inert in the present instance, the solvent must be saturated and have no acidic or basic sites.

Typical solvents are fluorotrichloromethane, carbon tetrachloride, pentane, hexane, diethyl ether and others.

At the conclusion of the reaction, the product is isolated by standard distillation techniques and ready for known uses.

This invention may be more fully understood from the following examples which are offered by way of illustration and not by way of limitation:

Example I

There are added to a reaction vessel 1.68 grams (10 mmoles) of diphenylacetylene and 25 ml. of fluorotrichloromethane. The solution is slurried with 2.0 grams (48 mmoles) of sodium fluoride. The mixture is thoroughly degassed and equilibrated at $-40°$ C. There is admitted slowly over a period of two hours, while the pressure is maintained at 400 mm., 10 mmoles of oxygen difluoride, 55% of which is consumed. The unreacted oxygen difluoride is distilled off and the sodium fluoride removed by filtration. The solvent is removed by vacuum distillation leaving the product as the residue. The product is a pale yellow oil. The NMR spectra shows a weak band at 5.49 m$\mu$ ($C_6H_5COF$) and strong carbonyl absorption at 5.85 m$\mu$.

The 2,4-dinitrophenylhydrazone of the product is prepared and recrystallized from ethanol. It melts at 181° to 182° C. (literature value 180° to 181° C.). The product is identified as $\alpha$-phenyl-$\alpha,\alpha$-difluoroacetophenone.

Example II

There are added to the reaction vessel 2.5 ml. (20 mmoles) of methylphenylacetylene, 5 ml. of fluorotrichloromethane and 5 ml. of diethyl ether. Sodium fluoride (2.0 grams, 48 mmoles) is added and the entire mixture thoroughly degassed. With the pressure maintained at 500 mm., oxygen difluoride is gradually added in the amount of 20 mmoles and the reaction is concluded when 50% of the oxygen difluoride has been consumed. This requires 70 minutes at $-40°$ C. The excess oxygen difluoride is removed and the sodium fluoride separated by filtration. The solvent is removed by fractionation leaving a pale yellow oil as the product. The product is analyzed by vapor phase chromatography giving a yield of 81% of $\alpha$-methyl-$\alpha,\alpha$-difluoroacetophenone. The $F^{19}$ NMR spectra contains a quartet ($J_{PH}=20$ c.p.s.) centered at $+6824$ c.p.s. (TFA). The proton NMR spectrum shows the non-aromatic protons as a triplet ($J_{PH}=20$ c.p.s.) center at 8.6$\delta$ in a ratio of 3 to 5 with the aromatic protons. The product contains 62.97% carbon (63.53% theoretical) and 5.02% hydrogen (4.74% theoretical).

Example III

There are added to the reaction vessel 3.4 grams (50 mmoles) of pentyne-2 (methylethylacetylene), 10 ml. of fluorotrichloromethane and 10 ml. of diethyl ether. Sodium fluoride (2.0 grams, 48 mmoles) is added and the entire mixture thoroughly degassed. Oxygen difluoride is gradually added in the amount of 50 mmoles and the reaction concluded when the uptake becomes sluggish. The reaction is conducted at 325 mm. This requires two hours at $-78°$ C. The unused oxygen difluoride is removed and the sodium fluoride separated by filtration. The crude mixture is distilled to produce 4.2 grams of colorless liquid, B.P. 64° to 67° C. at 756 mm. Analysis by vapor phase chromatography shows two products comprising 61% and 39% of the total. Both products possess carbonyl absorption at 1751 cm.$^{-1}$

and represent the two possible isomeric α-difluoroketones. Identification by proton NMR of the

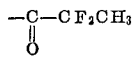

group establishes the structure of the 39% peak as 2,2-difluoropentanone-3. The remaining compound is the other isomer 3,3-difluoropentanone-2.

The isomeric mixture contains 48.96% carbon (49.18% theoretical) and 6.34% hydrogen (6.60% theoretical).

I claim:

1. A method for the preparation of difluoroketones having the formula

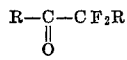

wherein R is selected from the group consisting of alkyl 1 to 12 carbon atoms, phenyl and alkyl-substituted phenyl in which the alkyl substitution totals up to eight carbon atoms, which comprises reacting oxygen difluoride ($OF_2$) with a compound having the formula $$R—C \equiv CR$$

in a temperature range of about —80° C. to 0° C. and at subatmospheric pressures of no greater than 700 mm., wherein the oxygen difluoride is added to the acetylene.

2. A method according to claim 1 wherein the temperature is about —80° C. to —40° C. and the oxygen difluoride is employed in excess.

3. A method according to claim 1 wherein the reaction is conducted in the presence of an inert volatile solvent and at pressures of 100 to 600 mm.

4. A method according to claim 1 wherein both R groups are phenyl.

5. A method according to claim 1 wherein both R groups are alkyl.

No references cited.

DANIEL D. HORWITZ, *Primary Examiner.*